July 15, 1941.                M. CURCIO                2,248,967
                        MEASURING INSTRUMENT
                        Filed Feb. 21, 1939
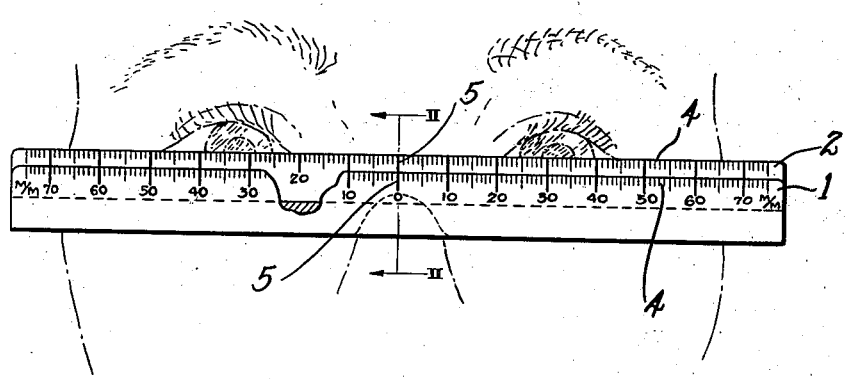
Fig. I
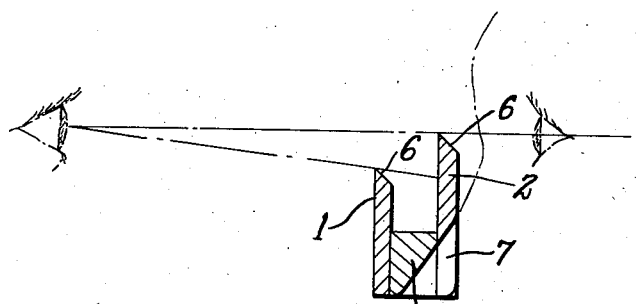
Fig. II
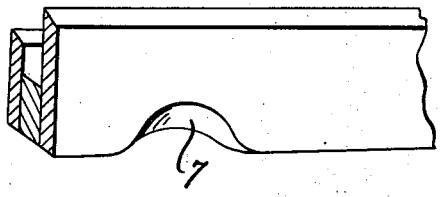
Fig. III
INVENTOR.
MICHAEL CURCIO
BY Harry H. Styll
ATTORNEY.

Patented July 15, 1941

2,248,967

UNITED STATES PATENT OFFICE 2,248,967

MEASURING INSTRUMENT

Michael Curcio, Philadelphia, Pa.

Application February 21, 1939, Serial No. 257,689

5 Claims. (Cl. 33—200)

This invention relates to improvements in measuring devices and has particular reference to an improved device for measuring the pupillary distance, and is known in the art as a Pupilometer.

A principal object of the invention is to provide a new and improved device for measuring with greater accuracy than has heretofore been possible the distance between the centers of the pupils of the eyes which is known in the art as the pupillary distance, and thus assuring the proper fit of the glasses when applied to the wearer.

Another object of the invention is to provide a new and improved measuring device of the character above set forth, by means of which the pupillary distance may be quickly and accurately obtained.

Another object of the invention is to provide a new and improved measuring device of the character described, which is simple and economical to manufacture and to use.

Other objects and advantages of the invention will become apparent from the following description taken in connection with the accompanying drawing, and it will be understood that many changes in the details of construction and arrangement of parts may be made without departing from the spirit of the invention as set forth in the accompanying claims. I, therefore, do not wish to be limited to the exact details of construction and arrangement of parts shown and described, as the preferred form has been shown by way of illustration only.

Referring to the drawing:

Fig. I is a front view of the measuring device of the invention in position on the face of a patient;

Fig. II is a sectional view taken on line II—II of Fig. I; and

Fig. III is a fragmentary rear perspective view of the device shown in Figs. I and II.

In the past the devices which have been on the market for the purpose of measuring the pupillary distance have either comprised simple rules or complicated and bulky devices. Both of these devices have had a common fault in that they provided only a single point for the examiner to read, that is, the examiner would read the graduation on the scale which appears to him to be at the center of the pupil of the patient's eye. Frequently, if the examiner's eye were not in exact alignment with the patient's eye when the measurement was made there would be an error in the measurement and the glasses made from the measurements would not be made to the proper measurements.

It, therefore, is a principal object of this invention to provide a new and improved measuring device for measuring the pupillary distance, which will provide for more accurate measurements and prevent errors of the type set forth above and which is simple and economical of manufacture and use.

Referring more particularly to the drawing, wherein similar reference characters designate corresponding parts throughout the several views, the device embodying the invention comprises a pair of scale members, 1 and 2 held in spaced relation with each other by the spacer member 3.

The scale members 1 and 2 may be made of any desired length but preferably are made to a length slightly more than the width of the face so as to allow room for holding the same by examiner. The rear scale member 2 is of slightly greater height than the height of the front scale member 1, as shown in Fig. II.

While the scale members 1 and 2 and spacer member 3 are shown as separate parts in the drawing, it is apparent that said parts may be made integral or separate, as desired, and also that said parts may be made of metal or of plastic composition, as desired.

The front surfaces of the scale members 1 and 2 contain the graduations 4, which are exactly the same on both scales, and are aligned with each other. These graduations 4 start from a central or zero point 5 on each scale, and extend from said central point 5 toward each of the ends of said scales. As will be noted from the drawing, the graduations are usually given in millimeters, as that is customary in the art, although they could be given in inches, if desired.

The upper edges of the scale members 1 and 2 are beveled from the rear toward the front, as shown at 6, for greater accuracy in reading, although this beveling is not necessary.

On the rear side of the rule is the cut-out portion 7. This cut out portion 7 is cut out so as to fit the nose, so that the rule can be supported on the nose when in use.

When measuring the pupillary distance of a patient, the operator rests the scale on the nose of the patient, as shown in Fig. I, with the nose of the patient fitting into the cut-out portion 7 of the rule, and the rule is held thereon in place by the hand of the examiner, with the top edge of the scale 2 extending substantially through the center of the pupils of both eyes of the patient.

The examiner then aligns one of his own eyes with the center of the pupil of one of the patient's eyes, by sighting across the scales of both rules until the reading on both of the scales is the same. That is, by lining up with his eye with the two corresponding points on the two scales and with the center of the pupil of the eye of the patient, he can be absolutely sure that his own eye is directly in line with the center of the pupil of the patient's eye, and that he is obtaining the proper reading on the scale.

He then does exactly the same with the center of the pupil of the patient's other eye, and then adds the two readings, that is, if the reading on each of the scales is 32 mm., then the patient's pupillary distance would be 64 mm.

In then making up the glasses, for the patient they are made so that it is exactly 64 mm. between the centers of the lenses. This assures proper fit of the glasses on the wearer.

It will be apparent that by the lining up of the the examiner of his own eye with the corresponding graduations on both scales and the center of the pupil of the patient's eye that any possibility of the examiner making an error in reading the scale is eliminated and, therefore, provides means whereby the pupillary distance may be measured with assurance that the measurement obtained is accurate.

From the above, it will be seen that I have provided simple, efficient, and economical means for measuring the pupillary distance with greater accuracy than has heretofore been possible and which is simple and easy to use.

Having described my invention, I claim:

1. A device of the character described comprising a relatively thin strip of material having a graduated scale adjacent a longitudinal edge thereof, a similar strip having a scale graduated in the same value adjacent a similar longitudinal edge thereof and spacer means secured to a side surface of each of said respective strips between said strips so as to support said strips in spaced substantially vertical relation with said spacer means and so as to support said longitudinal edges in substantially parallel relation and the respective graduations along said longitudinal edges in substantial alignment with each other, so as to be simultaneously visible in this relation, when viewed from the front along a line substantially perpendicular to the plane of the respective side surfaces of the strips.

2. A device of the character described comprising a relatively thin flat strip of material having a graduated scale adjacent the upper longitudinal edge thereof, a similar strip of material having a scale graduated in the same value along a similar longitudinal edge thereof and spacer means of less width than the strips secured to a side surface of each of said strips between said strips and with its lower edge surface located adjacent the lower edge surfaces of said strips to support said strips in substantially vertical relation therewith and to provide an upper space between said strips with the upper longitudinal edges supported in substantially parallel relation with each other and with the respective graduations along said upper longitudinal edges of said strips being positioned in substantial alignment with each other, so as to be simultaneously visible in this relation, when viewed from the front along a line substantially perpendicular to the plane of the respective side surfaces of the strips.

3. A device of the character described comprising a relatively thin strip of material having an upper longitudinal bevelled edge with a graduated scale along the front side surface of said edge, a similar strip of material having a similar bevel and a scale graduated in the same value along a similar longitudinal edge thereof with said strip being of a width less than the first strip and spacer means having a side surface secured to the front side surface of the first strip and its opposed side surface secured to the rear side surface of the second strip and with its lower edge surface substantially flush with the lower edges of the respective strips to support said strips in substantially vertical relation with said spacer means and to support the upper longitudinal edges thereof in substantially parallel relation with each other, the graduations of the rear scale being located above the graduations of the front scale, when the device is viewed from the front along a line substantially perpendicular with the plane of the front side surfaces of said strips, and being in substantial alignment with each other in said direction.

4. A device of the character described comprising a relatively thin strip of material having an upper longitudinal bevelled edge with a graduated scale along the front side surface of said edge, a similar strip of material having a simlar bevel and a scale graduated in the same value along a similar longitudinal edge thereof with said strip being of a width less than the first strip and spaced means having a side surface secured to the front side surface of the first strip and its opposed side surface secured to the rear side surface of the second strip and with its lower edge surface substantially flush with the lower edges of the respective strips to support said strips in substantially vertical relation with said spacer means and to support the upper longitudinal edges thereof in substantially parallel relation with each other, the graduations of the rear scale being located above the graduations of the front scale, when the device is viewed from the front along a line substantially perpendicular with the plane of the front side surfaces of said strips, and being in substantial alignment with each other in said direction, the said rear scale intermediate the lower longitudinal edge thereof having a recess shaped to fit over the bridge of the nose of the individual with which said device is being used.

5. A device of the character described comprising a base having spaced uprights disposed substantially vertically thereof, with said uprights having upper longitudinal edges in substantially parallel relation with each other, with each of said uprights having a scale graduated in the same value on a side surface thereof adjacent said upper longitudinal edges simultaneously visible when the device is viewed from the front along a line substantially perpendicular to the plane of the respective side surfaces having the graduated scales thereon, the respective graduations of said scales being so arranged as to be in substantial alignment with each other when viewed in said direction.

MICHAEL CURCIO.